(12) United States Patent
Hudman

(10) Patent No.: US 11,815,684 B2
(45) Date of Patent: Nov. 14, 2023

(54) SPATIALLY AND TIME VARYING POLARIZATION CORRECTION OPTIC FOR SCAN BEAM SYSTEMS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 163 days.

(21) Appl. No.: 17/166,837

(22) Filed: Feb. 3, 2021

(65) Prior Publication Data

US 2021/0247613 A1 Aug. 12, 2021

Related U.S. Application Data

(60) Provisional application No. 62/971,184, filed on Feb. 6, 2020.

(51) Int. Cl.
*G02B 27/01* (2006.01)
*G02B 27/28* (2006.01)
(Continued)

(52) U.S. Cl.
CPC ..... *G02B 27/0172* (2013.01); *G02B 27/0093* (2013.01); *G02B 27/28* (2013.01); *G06V 40/18* (2022.01); *G02B 2027/0187* (2013.01)

(58) Field of Classification Search
CPC ...... G02B 2027/0138; G02B 2027/014; G02B 2027/0187; G02B 27/0093;
(Continued)

(56) References Cited

U.S. PATENT DOCUMENTS 6,982,773 B2 1/2006 Kurtz et al.
7,160,017 B2 1/2007 Lee et al.
(Continued)

OTHER PUBLICATIONS

International Search Report and Written Opinion, dated Apr. 16, 2021, for International Application No. PCT/US21/16438, 18 pages.
(Continued)

*Primary Examiner* — Ram A Mistry
(74) *Attorney, Agent, or Firm* — SEED INTELLECTUAL PROPERTY LAW GROUP LLP

(57) ABSTRACT

The present disclosure related generally to techniques for improving the performance and efficiency of display systems, such as laser scan beam display systems or other types of display systems (e.g., micro-displays) of an HMD or other device. Display systems of the present disclosure may include a polarization compensation optic, such as a spatially varying polarizer, that provides phase retardation that varies as a function of position, which provides polarization compensation to provide light that is well suited for a polarization sensitive optic of the display system, such as a waveguide-based optical system, a pancake optical system, a birdbath optical system, a coating-based optical system, etc. The spatially varying polarizer may be varied spatially in real-time based on a user's gaze location to provide an optimized field of view in a region where the user is known or inferred to be gazing, thereby providing improved optical performance.

34 Claims, 9 Drawing Sheets

(51) Int. Cl.
*G02B 27/00* (2006.01)
*G06V 40/18* (2022.01)

(58) Field of Classification Search
CPC .. G02B 27/0172; G02B 27/28; G02B 27/286; G06V 40/18; G06V 40/19
See application file for complete search history.

(56) References Cited

U.S. PATENT DOCUMENTS

| | | | |
|---|---|---|---|
| 7,295,312 B1 | 11/2007 | Gerhart et al. | |
| 8,004,675 B2 | 8/2011 | Lefaudeux | |
| 8,235,533 B2 | 8/2012 | Hudman et al. | |
| 8,368,889 B2 | 2/2013 | Schwiegerling et al. | |
| 8,982,313 B2 | 3/2015 | Escuti et al. | |
| 9,298,041 B2 | 3/2016 | Escuti et al. | |
| 9,335,586 B2 | 5/2016 | Escuti et al. | |
| 9,410,677 B2 | 8/2016 | Wheatley et al. | |
| 10,203,489 B2 | 2/2019 | Khan et al. | |
| 10,495,798 B1 | 12/2019 | Peng et al. | |
| 10,890,768 B2 | 1/2021 | Kollin et al. | |
| 2009/0005961 A1* | 1/2009 | Grabowski | G02B 27/0101 701/532 |
| 2011/0310220 A1 | 12/2011 | McEldowney | |
| 2013/0286479 A1 | 10/2013 | Sung et al. | |
| 2014/0285878 A1* | 9/2014 | Escuti | G02B 5/3083 156/60 |
| 2015/0131311 A1 | 5/2015 | Wheatley et al. | |
| 2016/0182889 A1 | 6/2016 | Olmstead | |
| 2016/0349516 A1 | 12/2016 | Alexander et al. | |
| 2017/0068092 A1 | 3/2017 | Leister | |
| 2017/0184848 A1 | 6/2017 | Vallius | |
| 2018/0227567 A1 | 8/2018 | Chao et al. | |
| 2019/0243147 A1 | 8/2019 | Smithwick et al. | |
| 2019/0377183 A1 | 12/2019 | Sharp | |
| 2020/0117006 A1* | 4/2020 | Kollin | G02F 1/29 |
| 2020/0301147 A1 | 9/2020 | Klug | |
| 2021/0080720 A1* | 3/2021 | Zhao | G02B 27/0172 |

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.

Hornburg et al., "Wide color gamut multi-twist retarders," Proc. of SPIE, Emerging Liquid Crystal Technologies X, vol. 9384, 93840W, 2015, 11 pages.

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komanduri et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

* cited by examiner

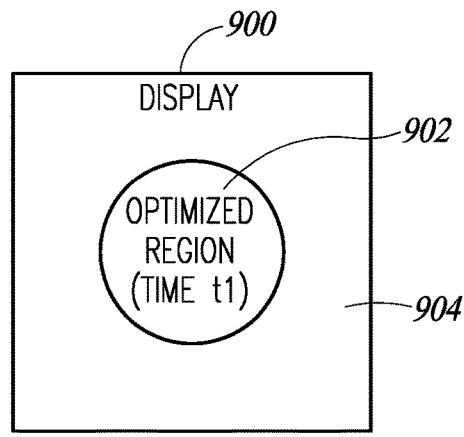
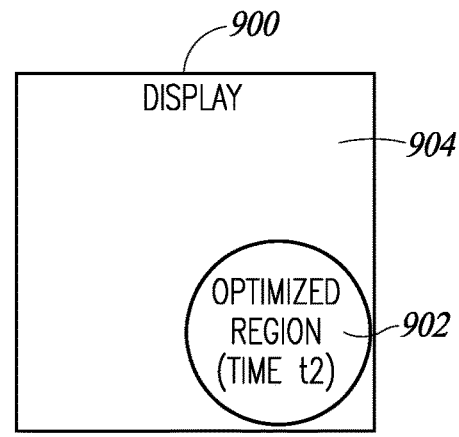
FIG. 9A    FIG. 9B
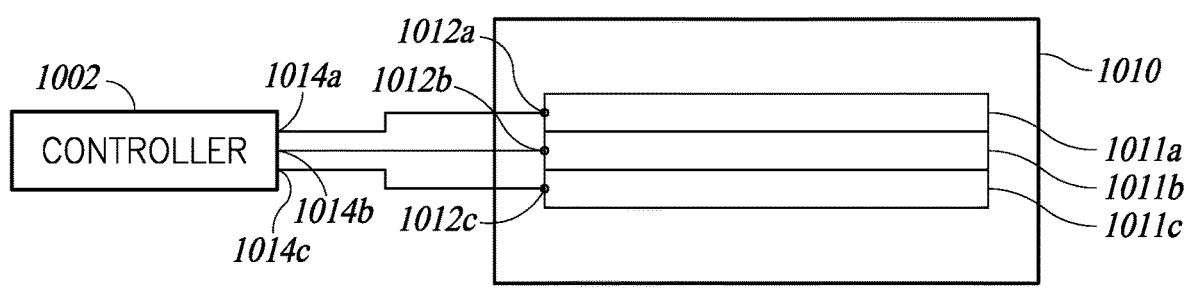
FIG. 10

SPATIALLY AND TIME VARYING POLARIZATION CORRECTION OPTIC FOR SCAN BEAM SYSTEMS

BACKGROUND

Technical Field

The present disclosure generally relates to display systems, and more particularly, to improving the efficiency and performance of display systems.

Description of the Related Art

One current generation of virtual reality ("VR") experiences is created using head-mounted displays ("HMDs"), which can be tethered to a stationary computer (such as a personal computer ("PC"), laptop, or game console), combined and/or integrated with a smart phone and/or its associated display, or self-contained. Generally, HMDs are display devices, worn on the head of a user, which have a small display device in front of one (monocular HMD) or each eye (binocular HMD). The display units are typically miniaturized and may include CRT, LCD, Liquid crystal on silicon (LCoS), OLED technologies, or laser scan beam displays, for example. A binocular HMD has the potential to display a different image to each eye. This capability is used to display stereoscopic images.

Demand for displays with heightened performance has increased with the development of smart phones, high-definition televisions, as well as other electronic devices. The growing popularity of virtual reality and augmented reality systems, particularly those using HMDs, has further increased such demand. Virtual reality systems typically envelop a wearer's eyes completely and substitute a "virtual" reality for the actual or physical view (or actual reality) in front of the wearer, while augmented reality systems typically provide a semi-transparent or transparent overlay of one or more screens in front of a wearer's eyes such that actual view is augmented with additional information, and mediated reality systems may similarly present information to a viewer that combines real-world elements with virtual elements.

BRIEF SUMMARY

A display system may be summarized as including a display light source; a pupil relay system positioned to relay a first pupil from the display light source to a second pupil at an eye of a viewer, the pupil relay system including a polarization sensitive optic; and a spatially varying polarizer having a polarization that spatially varies as a function of position to provide polarization compensation for the polarization sensitive optic; and control circuitry operatively coupled to the spatially varying polarizer, the control circuitry configured to receive gaze information from an eye tracking subsystem indicative of a user's current or predicted gaze location; and selectively adjust the variable polarization of the spatially varying polarizer based at least in part on the received gaze information. The spatially varying polarizer may include a plurality of layers, each of the plurality of layers being independently controllable by the control circuitry to be in an active state or an inactive state, wherein, in operation, the control circuitry controls the state of the plurality of layers to selectively adjust the variable polarization of the spatially varying polarizer. Each of the layers may have a spatially varying polarization that is different from at least one of the other of the plurality of layers. The control circuitry may optimize the spatially varying polarizer for a first region associated with the user's gaze location relative to a second region outside of the first region. The control circuitry may control the spatially varying polarizer to provide relatively higher brightness at a first region associated with the user's gaze location relative to a second region outside of the first region. The control circuitry may control the spatially varying polarizer to provide a relatively lower amount of stray light at a first region associated with the user's gaze location relative to a second region outside of the first region. The control circuitry may selectively adjust the variable polarization of the spatially varying polarizer in real-time as the received gaze information is updated by the eye tracking subsystem.

The display system may further include an eye tracking subsystem that generates the gaze information. The spatially varying polarizer may include a multi-twist retarder. The retardation of the spatially varying polarizer may vary as a function of a horizontal dimension or a vertical dimension. The retardation of the spatially varying polarizer may vary across a field of view of the display system. The polarization sensitive optic may include a waveguide-based optical system, a pancake optical system, a birdbath optical system, or a coating-based optical system.

The display light source may include a laser light source, and the display system may further include a scan mirror positioned to receive a light beam from the laser light source and to relay the received light toward the pupil relay system. The display system may further include a beam-forming optic positioned between the laser light source and the scan mirror. At least a portion of the spatially varying polarizer may be positioned on, adjacent to, or in the polarization sensitive optic. The polarization sensitive optic may include a waveguide, and the spatially varying polarizer is positioned on the waveguide, inside the waveguide, or proximate a port of the waveguide. The display system may be a display system of a head-mounted display system.

A head-mounted display system may be summarized as including a support structure; a display system coupled to the support structure, the display system including a display light source; and a pupil relay system positioned to relay a first pupil from the display light source to a second pupil at an eye of a viewer, the pupil relay system including a polarization sensitive optic; and a spatially varying polarizer having a polarization that spatially varies as a function of position to provide polarization compensation for the polarization sensitive optic; and control circuitry operatively coupled to the spatially varying polarizer, the control circuitry configured to receive gaze information from an eye tracking subsystem indicative of a user's current or predicted gaze location; and selectively adjust the variable polarization of the spatially varying polarizer based at least in part on the received gaze information. The spatially varying polarizer may include a plurality of layers, each of the plurality of layers being independently controllable by the control circuitry to be in an active state or an inactive state, wherein, in operation, the control circuitry controls the state of the plurality of layers to selectively adjust the variable polarization of the spatially varying polarizer. Each of the layers may have a spatially varying polarization that is different from at least one of the other of the plurality of layers. The control circuitry may optimize the spatially varying polarizer for a first region associated with the user's gaze location relative to a second region outside of the first region. The control circuitry may control the spatially varying polarizer to provide relatively higher brightness at a first region associated with the user's gaze location relative to a second region outside of the first region. The control circuitry may control the spatially varying polarizer to provide a relatively lower amount of stray light at a first region associated with the user's gaze location relative to a second region outside of the first region. The control circuitry may selectively adjust the variable polarization of the spatially varying polarizer in real-time as the received gaze information is updated by the eye tracking subsystem. The spatially varying polarizer may include a multi-twist retarder. The polarization sensitive optic may include a waveguide-based optical system, a pancake optical system, a birdbath optical system, or a coating-based optical system.

The display light source may include a laser light source, and the display system may further include a scan mirror positioned to receive a light beam from the laser light source and to relay the received light toward the pupil relay system.

The head-mounted display system may further include a beam-forming optic positioned between the laser light source and the scan mirror. The polarization sensitive optic may include a waveguide, and the spatially varying polarizer is positioned on the waveguide, inside the waveguide, or proximate a port of the waveguide.

A head-mounted display system may be summarized as including a support structure; a display system coupled to the support structure, the display system including a laser light source; a scan mirror positioned to receive a light beam from the laser light source; and a pupil relay system positioned to relay a first pupil received from the scan mirror to a second pupil at an eye of a viewer, the pupil relay system including a polarization sensitive optic; and a spatially varying polarizer having a polarization that spatially varies as a function of position to provide polarization compensation for the polarization sensitive optic; an eye tracking subsystem operative to generate gaze information indicative of a user's current or predicted gaze location; and control circuitry operatively coupled to the spatially varying polarizer, the control circuitry configured to receive gaze information from the eye tracking subsystem as the user views a display of the display system; and selectively adjust the variable polarization of the spatially varying polarizer based at least in part on the received gaze information. The spatially varying polarizer may include a plurality of layers, each of the plurality of layers being independently controllable by the control circuitry to be in an active state or an inactive state, wherein, in operation, the control circuitry controls the state of the plurality of layers to selectively adjust the variable polarization of the spatially varying polarizer. Each of the layers may have a spatially varying polarization that is different from at least one of the other of the plurality of layers. The spatially varying polarizer may include a multi-twist retarder. The polarization sensitive optic may include a waveguide-based optical system, a pancake optical system, a birdbath optical system, or a coating-based optical system.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 9A is a schematic diagram of a display illustrating an optimized region in a center of the display at a first time (t1) wherein the spatially varying polarizer is optimized for that region based on the user's gaze location, according to one non-limiting illustrated implementation.

FIG. 9B is a schematic diagram of a display illustrating an optimized region in a periphery of the display at a second time (t2) wherein the spatially varying polarizer is optimized for that region based on the user's gaze location, according to one non-limiting illustrated implementation.

FIG. 10 shows a stack of spatially varying polarizer layers coupled to a controller, according to one non-limiting illustrated implementation.

DETAILED DESCRIPTION

Figure 1:
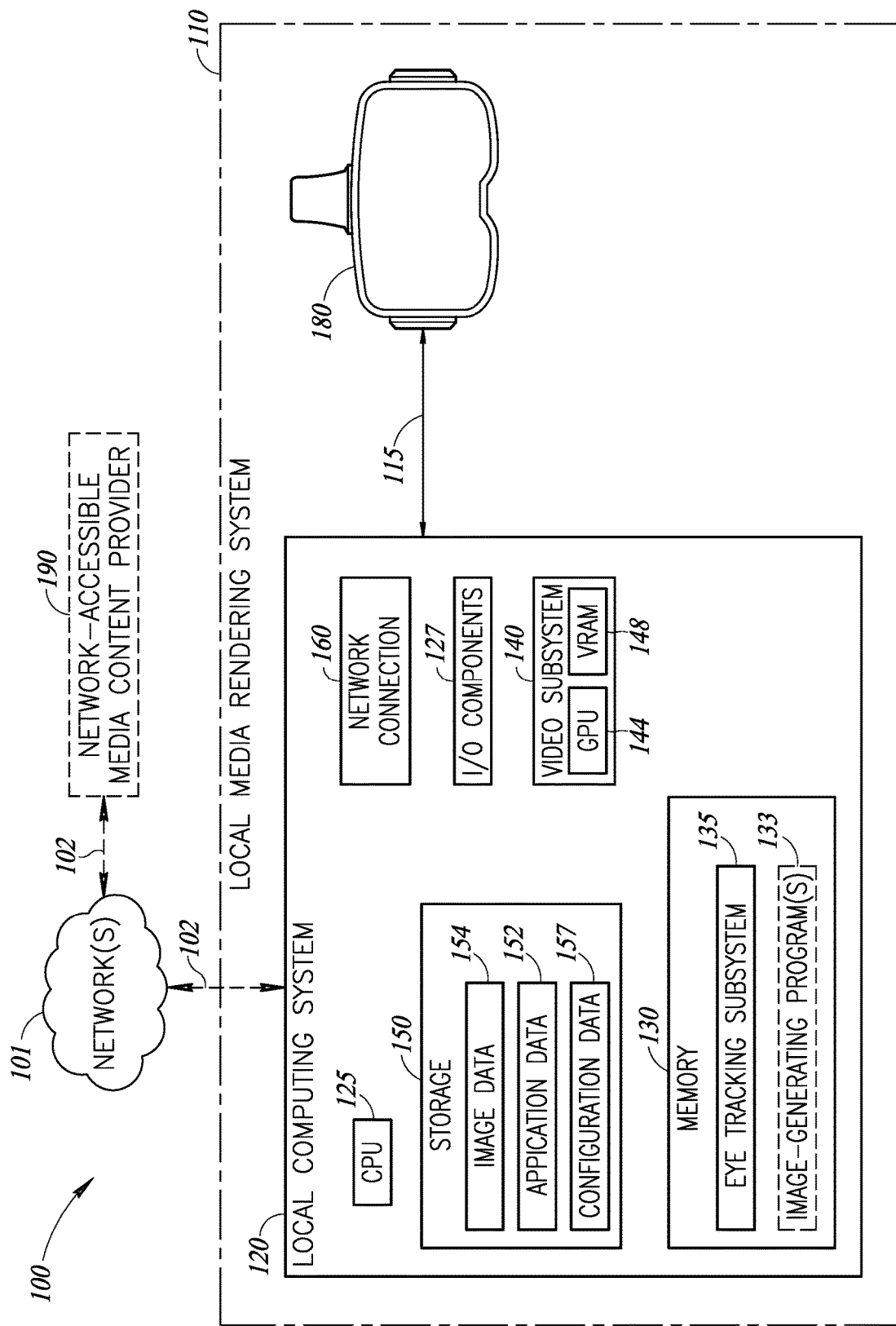
FIG. 1 is a schematic diagram of a networked environment that includes one or more systems suitable for performing at least some techniques described in the present disclosure.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

The present disclosure relates generally to techniques for improving the performance and efficiency of display systems, such as laser scan beam display systems or other types of display systems (e.g., micro-displays). As discussed further below, at least some embodiments of the present disclosure improve the performance of display systems by providing a spatially varying polarizer that provides phase retardation that varies as a function of position, which provides polarization compensation and produces light that is well suited for polarization sensitive optics of the display system, such as a waveguide-based optical system, a pancake optical system, a birdbath optical system, a coating-based optical system, etc. Such techniques significantly improve the intensity of the light that passes through the polarization sensitive optics while also reducing undesirable stray light. Advantageously, the polarization of the spatially varying polarizer may be selectively varied in real-time based on a known or inferred gaze location of the user. This may be achieved by providing a plurality of layers of spatially varying polarizers stacked together, wherein each of the layers has a different spatially varying polarization, and is independently controllable to be in in active state or an inactive state. For many types of optics, it may be difficult to provide polarization correction over an entire field of view, but it may be possible to provide significant polarization correction over a relatively narrow field of view. Thus, using gaze information, a relatively narrow field of view or region where the user is gazing may be optimized to provide enhanced brightness, reduced stray light, or other characteristics that enhance a user's viewing experience. The gaze information may be obtained in any manner, such as via an eye tracking subsystem. Alternatively or additionally, the gaze information may be inferred based on information about the content being displayed. For example, if a particular object is the intended focus of a scene being displayed, the system may optimize a field of view that includes the object, since the user is likely to be gazing in that direction.

Initially, an example head-mounted display device application for the techniques described herein is discussed with reference to FIGS. 1-4. Then, with reference to FIGS. 5-12, example implementations of display systems that include spatially and time varying polarization compensation optics are discussed.

Example Head-Mounted Display System and Environment

Figure 2:
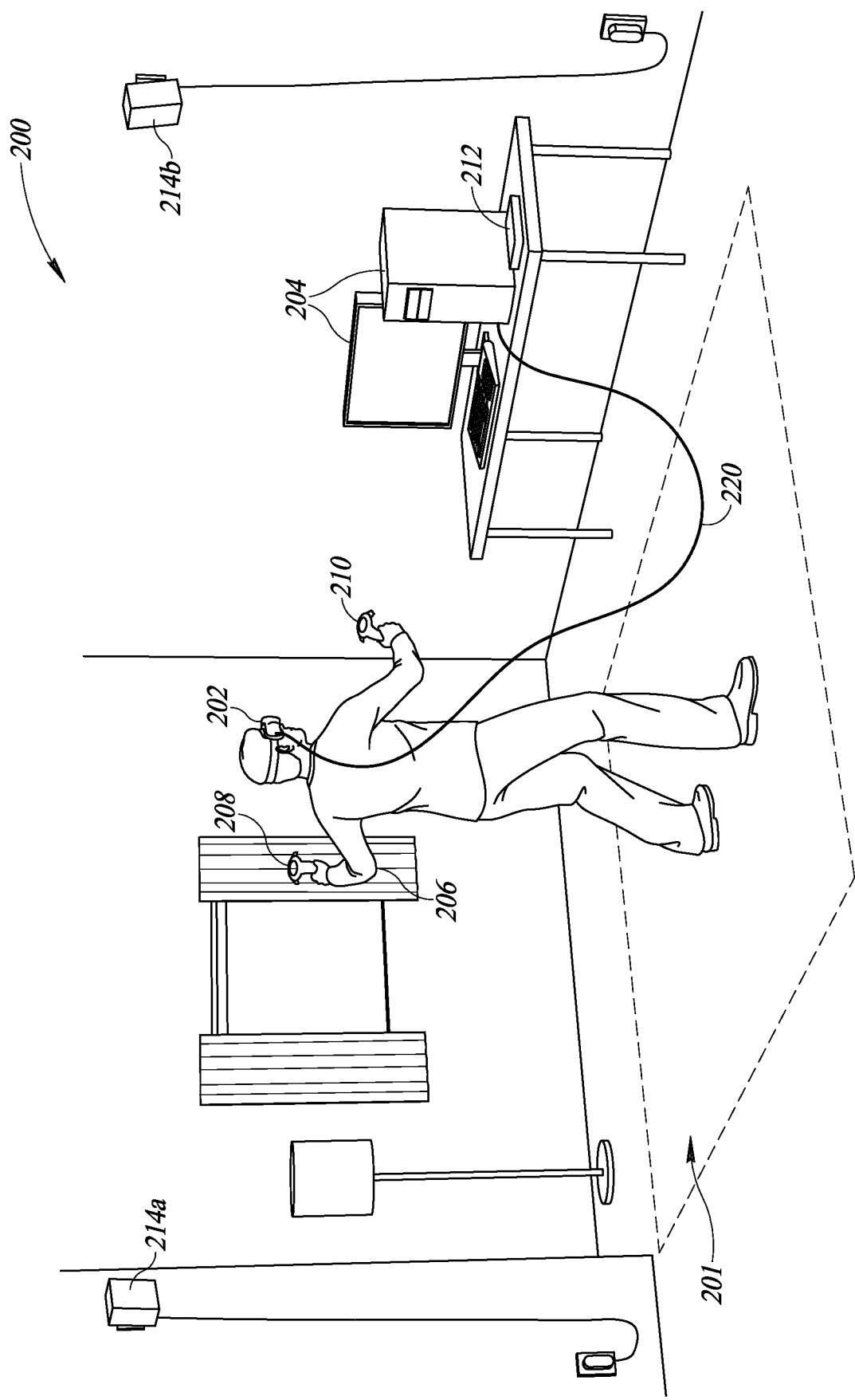
FIG. 2 is a diagram illustrating an example environment in which at least some of the described techniques are used with an example head-mounted display device that is tethered to a video rendering computing system and providing a virtual reality display to a user.

FIG. 1 is a schematic diagram of a networked environment 100 that includes a local media rendering (LMR) system 110 (e.g., a gaming system), which includes a local computing system 120 and display device 180 (e.g., an HMD device with two display panels) suitable for performing at least some techniques described herein. In the depicted embodiment of FIG. 1, the local computing system 120 is communicatively connected to display device 180 via transmission link 115 (which may be wired or tethered, such as via one or more cables as illustrated in FIG. 2 (cable 220), or instead may be wireless). In other embodiments, the local computing system 120 may provide encoded image data for display to a panel display device (e.g., a TV, console or monitor) via a wired or wireless link, whether in addition to or instead of the HMD device 180, and the display devices each includes one or more addressable pixel arrays. In various embodiments, the local computing system 120 may include a general purpose computing system; a gaming console; a video stream processing device; a mobile computing device (e.g., a cellular telephone, PDA, or other mobile device); a VR or AR processing device; or other computing system.

In the illustrated embodiment, the local computing system 120 has components that include one or more hardware processors (e.g., centralized processing units, or "CPUs") 125, memory 130, various I/O ("input/output") hardware components 127 (e.g., a keyboard, a mouse, one or more gaming controllers, speakers, microphone, IR transmitter and/or receiver, etc.), a video subsystem 140 that includes one or more specialized hardware processors (e.g., graphics processing units, or "GPUs") 144 and video memory (VRAM) 148, computer-readable storage 150, and a network connection 160. Also in the illustrated embodiment, an embodiment of an eye tracking subsystem 135 executes in memory 130 in order to perform at least some of the described techniques, such as by using the CPU(s) 125 and/or GPU(s) 144 to perform automated operations that implement those described techniques, and the memory 130 may optionally further execute one or more other programs 133 (e.g., to generate video or other images to be displayed, such as a game program). As part of the automated operations to implement at least some techniques described herein, the eye tracking subsystem 135 and/or programs 133 executing in memory 130 may store or retrieve various types of data, including in the example database data structures of storage 150, in this example, the data used may include various types of image data information in database ("DB") 154, various types of application data in DB 152, various types of configuration data in DB 157, and may include additional information, such as system data or other information.

The LMR system 110 is also, in the depicted embodiment, communicatively connected via one or more computer networks 101 and network links 102 to an exemplary network-accessible media content provider 190 that may further provide content to the LMR system 110 for display, whether in addition to or instead of the image-generating programs 133. The media content provider 190 may include one or more computing systems (not shown) that may each have components similar to those of local computing system 120, including one or more hardware processors, I/O components, local storage devices and memory, although some details are not illustrated for the network-accessible media content provider for the sake of brevity.

It will be appreciated that, while the display device 180 is depicted as being distinct and separate from the local computing system 120 in the illustrated embodiment of FIG. 1, in certain embodiments some or all components of the local media rendering system 110 may be integrated or housed within a single device, such as a mobile gaming device, portable VR entertainment system, HMD device, etc. In such embodiments, transmission link 115 may, for example, include one or more system buses and/or video bus architectures.

As one example involving operations performed locally by the local media rendering system 120, assume that the local computing system is a gaming computing system, such that application data 152 includes one or more gaming applications executed via CPU 125 using memory 130, and that various video frame display data is generated and/or processed by the image-generating programs 133, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system 120 and provided via the wired or wireless transmission link 115 to the display device 180.

It will also be appreciated that computing system 120 and display device 180 are merely illustrative and are not intended to limit the scope of the present disclosure. The computing system 120 may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may include any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components.

It will also be appreciated that, while various items are illustrated as being stored in memory or on storage while being used, these items or portions of them may be transferred between memory and other storage devices for purposes of memory management or data integrity. Thus, in some embodiments, some or all of the described techniques may be performed by hardware that include one or more processors or other configured hardware circuitry or memory or storage, such as when configured by one or more software programs and/or data structures (e.g., by execution of software instructions of the one or more software programs and/or by storage of such software instructions and/or data structures). Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 2 illustrates an example environment 200 in which at least some of the described techniques are used with an example HMD device 202 that is coupled to a video rendering computing system 204 via a tethered connection 220 (or a wireless connection in other embodiments) to provide a virtual reality display to a human user 206. The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

In the illustrated example, the environment 200 may include one or more base stations 214 (two shown, labeled base stations 214a and 214b) that may facilitate tracking of the HMD device 202 or the controllers 208 and 210. As the user moves location or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining or verifying the position of the HMD device). After the tracked position of the HMD device 202 is known, corresponding information is transmitted to the computing system 204 via the tether 220 or wirelessly, which uses the tracked position information to generate one or more next images of the simulated environment to display to the user.

There are numerous different methods of positional tracking that may be used in the various implementations of the present disclosure, including, but not limited to, acoustic tracking, inertial tracking, magnetic tracking, optical tracking, combinations thereof, etc. In at least some implementations, the HMD device 202 may include one or more optical receivers or sensors that may be used to implement tracking functionality or other aspects of the present disclosure. For example, the base stations 214 may each sweep an optical signal across the tracked volume 201. Depending on the requirements of each particular implementation, each base station 214 may generate more than one optical signal. For example, while a single base station 214 is typically sufficient for six-degree-of-freedom tracking, multiple base stations (e.g., base stations 214a, 214b) may be necessary or desired in some embodiments to provide robust room-scale tracking for HMD devices and peripherals. In this example, optical receivers are incorporated into the HMD device 202 and or other tracked objects, such as the controllers 208 and 210. In at least some implementations, optical receivers may be paired with an accelerometer and gyroscope Inertial Measurement Unit ("IMU") on each tracked device to support low-latency sensor fusion.

In at least some implementations, each base station 214 includes two rotors which sweep a linear beam across the tracked volume 201 on orthogonal axes. At the start of each sweep cycle, the base station 214 may emit an omni-directional light pulse (referred to as a "sync signal") that is visible to all sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in at least some implementations the base station light may be modulated in such a way as to make it easy to differentiate from any interfering signals, and/or to filter the sensor from any wavelength of radiation other than that of base station signals.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
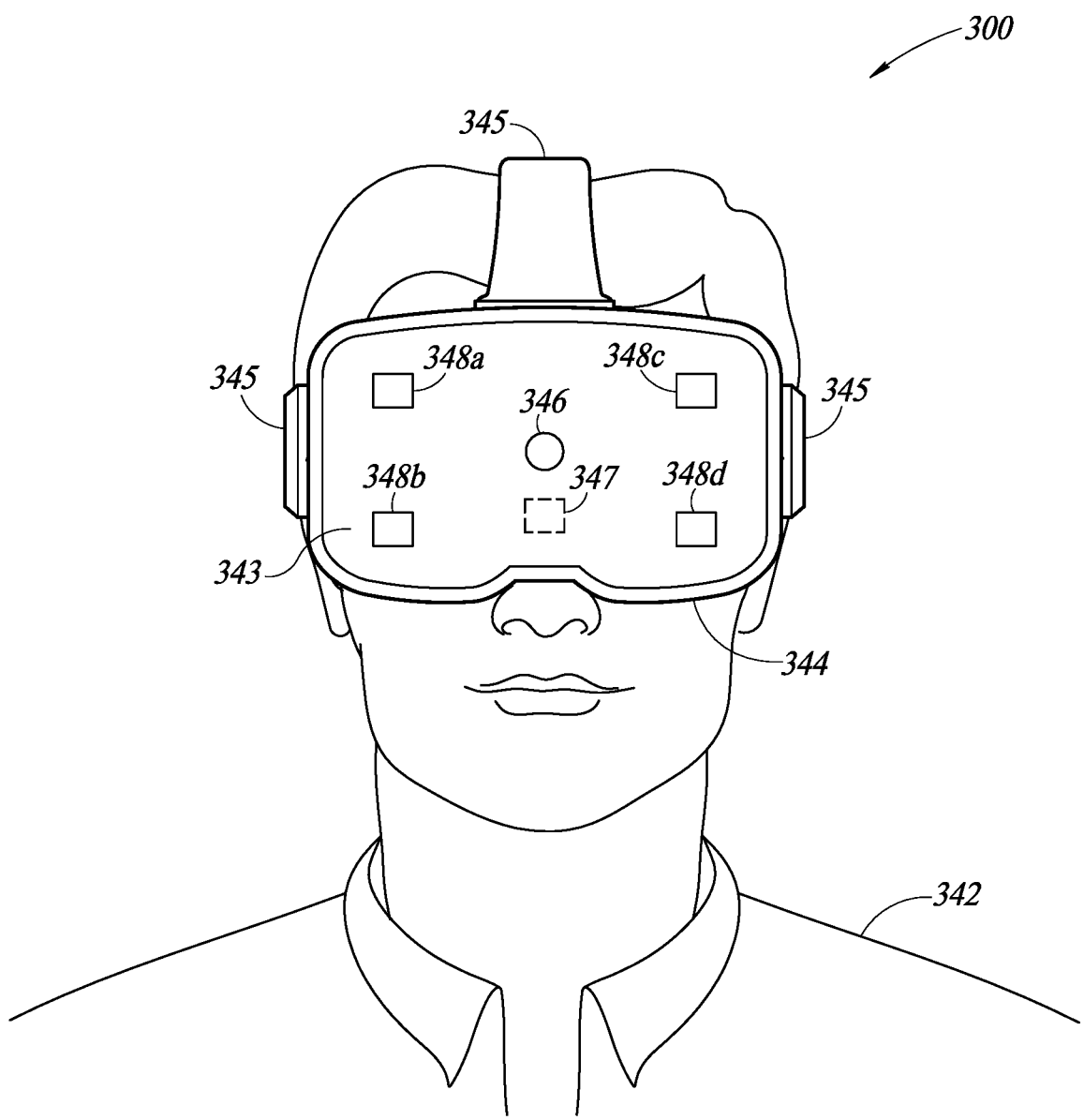
FIG. 3 is a front pictorial diagram of an example HMD device having binocular display subsystems.

FIG. 3 shows information 300 illustrating a front view of an example HMD device 344 when worn on the head of a user 342. The HMD device 344 includes a front-facing structure 343 that supports a front-facing or forward camera 346 and a plurality of sensors 348a-348d (collectively 348) of one or more types. As one example, some or all of the sensors 348 may assist in determining the location and orientation of the device 344 in space, such as light sensors to detect and use light information emitted from one or more external devices (not shown, e.g., base stations 214 of FIG. 2). As shown, the forward camera 346 and the sensors 348 are directed forward toward an actual scene or environment (not shown) in which the user 342 operates the HMD device 344. The actual physical environment may include, for example, one or more objects (e.g., walls, ceilings, furniture, stairs, cars, trees, tracking markers, or any other types of objects). The particular number of sensors 348 may be fewer or more than the number of sensors depicted. The HMD device 344 may further include one or more additional components that are not attached to the front-facing structure (e.g., are internal to the HMD device), such as an IMU (inertial measurement unit) 347 electronic device that measures and reports the HMD device's 344 specific force, angular rate, and/or the magnetic field surrounding the HMD device (e.g., using a combination of accelerometers and gyroscopes, and optionally, magnetometers). The HMD device may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device, as discussed in greater detail below with respect to FIG. 4.

The illustrated example of the HMD device 344 is supported on the head of user 342 based at least in part on one or more straps 345 that are attached to the housing of the HMD device 344 and that extend wholly or partially around the user's head. While not illustrated here, the HMD device 344 may further have one or more external motors, such as attached to one or more of the straps 345, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators in at least some embodiments to similarly modify their shape and/or locations to modify the alignment or other positioning of the display device relative to one or more pupils of one or more users of the display device.

Figure 4:
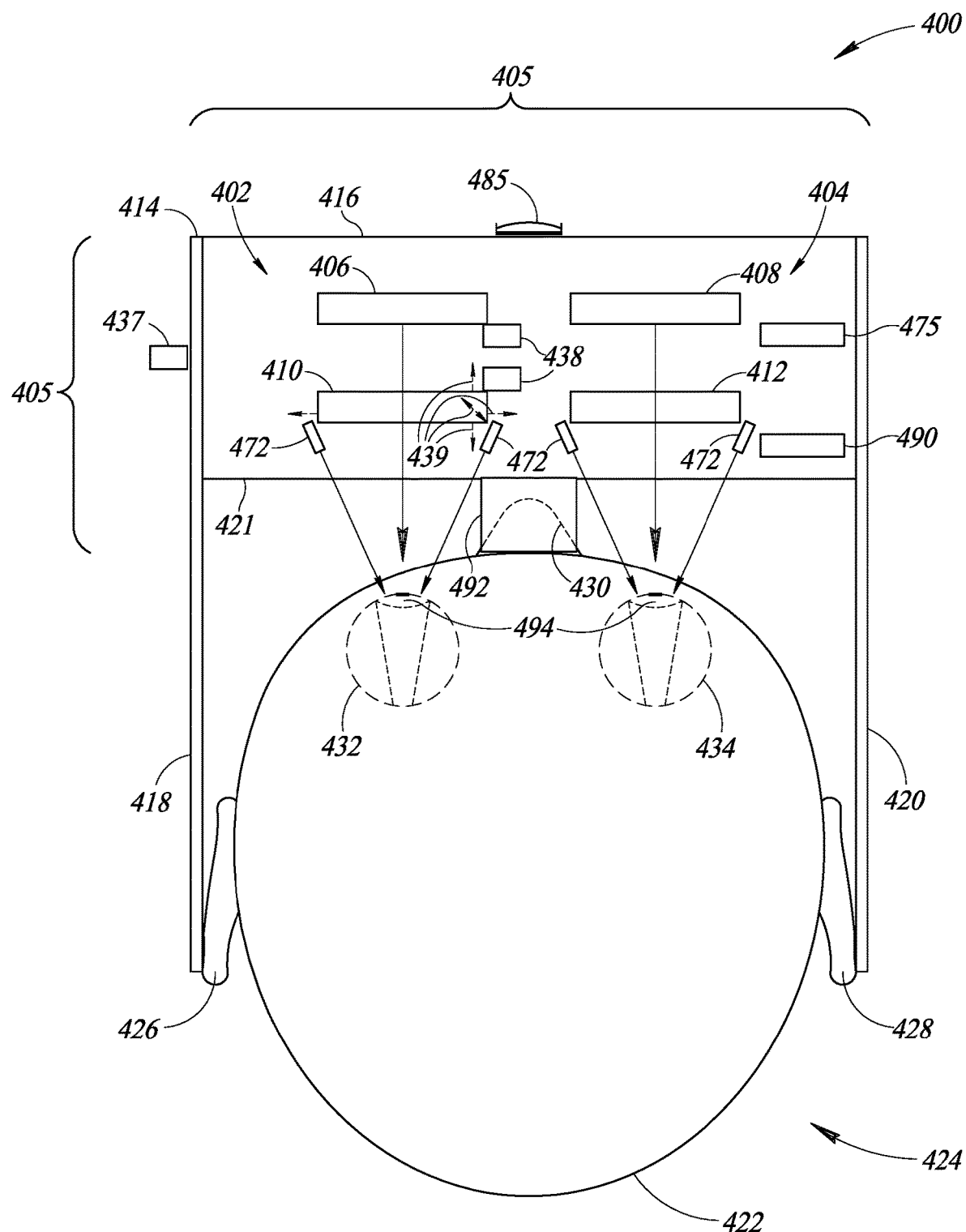
FIG. 4 illustrates a top plan view of an HMD device having binocular display subsystems and various sensors, according to an example embodiment of the present disclosure.

FIG. 4 illustrates a simplified top plan view 400 of an HMD device 405 that includes a pair of near-to-eye display systems 402 and 404. The HMD device 405 may, for example, be the same or similar HMD devices illustrated in FIGS. 1-3 or a different HMD device, and the HMD devices discussed herein may further be used in the examples discussed further below. The near-to-eye display systems 402 and 404 of FIG. 4 include display panels 406 and 408, respectively (e.g., OLED micro-displays), and respective optical lens systems 410 and 412 that each have one or more optical lenses. The display systems 402 and 404 may be mounted to or otherwise positioned within a housing (or frame) 414, which includes a front-facing portion 416 (e.g., the same or similar to the front-facing surface 343 of FIG. 3), a left temple 418, right temple 420 and interior surface 421 that touches or is proximate to a face of a wearer user 424 when the HMD device is worn by the user. The two display systems 402 and 404 may be secured to the housing 414 in an eye glasses arrangement which can be worn on the head 422 of a wearer user 424, with the left temple 418 and right temple 420 resting over the user's ears 426 and 428, respectively, while a nose assembly 492 may rest over the user's nose 430. In the example of FIG. 4, the HMD device 405 may be supported on the head of the user in part or in whole by the nose display and/or the right and left over-ear temples, although straps (not shown) or other structures may be used in some embodiments to secure the HMD device to the head of the user, such as the embodiments shown in FIGS. 2 and 3. The housing 414 may be shaped and sized to position each of the two optical lens systems 410 and 412 in front of one of the user's eyes 432 and 434, respectively, such that a target location of each pupil 494 is centered vertically and horizontally in front of the respective optical lens systems and/or display panels. Although the housing 414 is shown in a simplified manner similar to eyeglasses for explanatory purposes, it should be appreciated that in practice more sophisticated structures (e.g., goggles, integrated headband, helmet, straps, etc.) may be used to support and position the display systems 402 and 404 on the head 422 of user 424.

The HMD device 405 of FIG. 4, and the other HMD devices discussed herein, is capable of presenting a virtual reality display to the user, such as via corresponding video presented at a display rate such as 30 or 60 or 90 frames (or images) per second, while other embodiments of a similar system may present an augmented reality display to the user. Each of the displays 406 and 408 of FIG. 4 may generate light which is transmitted through and focused by the respective optical lens systems 410 and 412 onto the eyes 432 and 434, respectively, of the user 424. The pupil 494 aperture of each eye, through which light passes into the eye, will typically have a pupil size ranging from 2 mm (millimeters) in diameter in very bright conditions to as much as 8 mm in dark conditions, while the larger iris in which the pupil is contained may have a size of approximately 12 mm—the pupil (and enclosing iris) may further typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 424 as images and/or video. In some implementations, the distance between each of the optical lens systems 410 and 412 and the user's eyes 432 and 434 may be relatively short (e.g., less than 30 mm, less than 20 mm), which advantageously causes the HMD device to appear lighter to the user since the weight of the optical lens systems and the display systems are relatively close to the user's face, and also may provide the user with a greater field of view. While not illustrated here, some embodiments of such an HMD device may include various additional internal and/or external sensors.

In the illustrated embodiment, the HMD device 405 of FIG. 4 further includes hardware sensors and additional components, such as to include one or more accelerometers and/or gyroscopes 490 (e.g., as part of one or more IMU units). As discussed in greater detail elsewhere herein, values from the accelerometer(s) and/or gyroscopes may be used to locally determine an orientation of the HMD device. In addition, the HMD device 405 may include one or more front-facing cameras, such as camera(s) 485 on the exterior of the front portion 416, and whose information may be used as part of operations of the HMD device, such as for providing AR functionality or positioning functionality. Furthermore, the HMD device 405 may further include other components 475 (e.g., electronic circuits to control display of images on the display panels 406 and 408, internal storage, one or more batteries, position tracking devices to interact with external base stations, etc.), as discussed in greater detail elsewhere herein. Other embodiments may not include one or more of the components 475, 485 and/or 490. While not illustrated here, some embodiments of such an HMD device may include various additional internal and/or external sensors, such as to track various other types of movements and position of the user's body, eyes, controllers, etc.

In the illustrated embodiment, the HMD device 405 of FIG. 4 further includes hardware sensors and additional components that may be used by disclosed embodiments as part of the described techniques for determining user pupil or gaze direction, which may be provided to one or more components associated with the HMD device for use thereby, as discussed elsewhere herein. The hardware sensors in this example include one or more eye tracking assemblies 472 of an eye tracking subsystem that are mounted on or near the display panels 406 and 408 and/or located on the interior surface 421 near the optical lens systems 410 and 412 for use in acquiring information regarding the actual locations of the user's pupils 494, such as separately for each pupil in this example.

Each of the eye tracking assemblies 472 may include one or more light sources (e.g., IR LEDs) and one or more light detectors (e.g., silicon photodiodes). Further, although only four total eye tracking assemblies 472 are shown in FIG. 4 for clarity, it should be appreciated that in practice a different number of eye tracking assemblies may be provided. In some embodiments, a total of eight eye tracking assemblies 472 are provided, four eye tracking assemblies for each eye of the user 424. Further, in at least some implementations, each eye tracking assembly includes a light source directed at one of the user's 424 eyes 432 and 434, a light detector positioned to receive light reflected by the respective eye of the user, and a polarizer positioned and configured to prevent light that is reflected via specular reflection from being imparted on the light detector.

As discussed in greater detail elsewhere herein, information from the eye tracking assemblies 472 may be used to determine and track the user's gaze direction during use of the HMD device 405. Furthermore, in at least some embodiments, the HMD device 405 may include one or more internal motors 438 (or other movement mechanisms) that may be used to move 439 the alignment and/or other positioning (e.g., in the vertical, horizontal left-and-right and/or horizontal front-and-back directions) of one or more of the optical lens systems 410 and 412 and/or display panels 406 and 408 within the housing of the HMD device 405, such as to personalize or otherwise adjust the target pupil location of one or both of the near-to-eye display systems 402 and 404 to correspond to the actual locations of one or both of the pupils 494. Such motors 438 may be controlled by, for example, user manipulation of one or more controls 437 on the housing 414 and/or via user manipulation of one or more associated separate I/O controllers (not shown). In other embodiments the HMD device 405 may control the alignment and/or other positioning of the optical lens systems 410 and 412 and/or display panels 406 and 408 without such motors 438, such as by use of adjustable positioning mechanisms (e.g., screws, sliders, ratchets, etc.) that are manually changed by the user via use of the controls 437. In addition, while the motors 438 are illustrated in FIG. 4 for only one of the near-to-eye display systems, each near-to-eye display system may have its own one or more motors in some embodiments, and in some embodiments one or more motors may be used to control (e.g., independently) each of multiple near-to-eye display systems.

While the described techniques may be used in some embodiments with a display system similar to that illustrated, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens, as discussed elsewhere herein. In other embodiments, the user may view one or more images through one or more optical lens that are produced in manners other than via a display panel, such as on a surface that reflects light from another light source (e.g. laser scan beam) in part or in whole.

Example Display Systems

Figure 5:
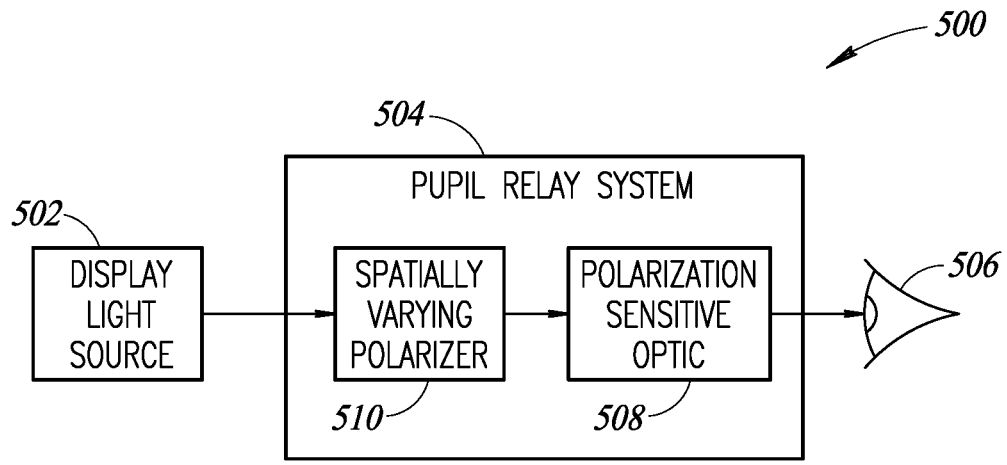
FIG. 5 is a schematic block diagram of a display system that includes a spatially varying polarizer, according to one non-limiting illustrated implementation.

FIG. 5 is a schematic block diagram of a display system 500 according to one non-limiting illustrated implementation. The display system may 500 may be a display system of a head-mounted display system, such as the head-mounted display systems discussed above, or any other type of display system (e.g., wearable or non-wearable display system). The display system 500 may include a scan beam display system or another type of display system (e.g., micro-display). In at least some implementations, the display system 500 may be one of two substantially identical display systems provided in a device, such as a head-mounted display device.

The display system 500 includes a display light source 502 that is optically coupled to a pupil relay system 504. The display light source 502 may include a laser scan beam light source, a micro-display, or any other suitable display light source. The pupil relay system 504 is positioned to relay a first pupil from the display light source 502 to a second pupil at an eye 506 of a viewer (or other image plane, surface, or material). The pupil relay system 504 includes a polarization sensitive optic 508 (e.g., a post-scan optic), which may include one or more of a waveguide-based optical system, a pancake optical system, a birdbath optical system, a coating-based optical system, or other optics. The polarization sensitive optic 508 may include one more components. The efficiency of the polarization sensitive optic 508 may be very sensitive to the polarization of light that passes therethrough. That is, different polarizations will significantly change the intensity and stray light that makes it out of the polarization sensitive optic 508.

To optimize the polarization of light that is provided to the polarization sensitive optic 508, the pupil relay system 504 of the display system 500 further includes a spatially varying polarizer 510 having a polarization that spatially varies as a function of position, which functions to compensation for changes in polarization to provide uniform polarized light or, more generally optimized polarized light, to the polarization sensitive optic 508. The spatially varying polarizer 510 may comprise a single layer or may comprises a plurality of layers, such as a plurality of layers that are each independently controllable to be in an active or inactive state. For example, the polarization sensitive optic 508 may be configured to compensate for or "undo" any of the polarization that one or more mirrors or other optics generate from compound angles. As discussed further below, the spatially varying polarizer 510 may be selectively adjusted in real-time to provide optimized performance in a region or field of view based on the user's gaze location.

The spatially varying polarizer 510 may include a wave retarder that is formed of birefringent materials. Birefringence is the property of a material that has a refractive index that depends on the polarization and propagation direction of light. The wave retarder alters the polarization state or phase of light traveling through the wave retarder. The wave retarder may have a slow axis (or extraordinary axis) and a fast axis (ordinary axis). As polarized light travels through the wave retarder, the light along the fast axis travels more quickly than along the slow axis.

As discussed above, the spatially varying polarizer 510 may provide phase retardation that varies a function of position, e.g., horizontal position, vertical position, radial position, across a field of view (e.g., on-axis to off-axis) which allows for more uniform and efficient distribution of the light from the display light source 502 to the polarization sensitive optic 508. The particular manner in which the retardation of the spatially varying polarizer 510 varies may be dependent on the specific configuration and materials of the optical system(s) of the display system 500, such as the polarization state of incident light, incident angle(s), materials, geometry of various components, etc.

As an example, the spatially varying polarizer 510 may provide no retardation at a first position, and may linearly increase the retardation to provide a retardation of $\lambda/4$ (or other value) at a second position of the spatially varying polarizer. Generally, the spatially varying polarizer 510 may provide retardation that varies in any way as a function of position, and the amounts of retardation may be any value (e.g., $\lambda/20$, $\lambda/10$, $\lambda/4$, $\lambda$, $2\lambda$). Further, the amount of retardation may increase only in one or more directions, decrease only in one or more directions, or both increase and decrease. The amount of retardation may vary continuously, or may vary in a number of steps. The amount of retardation may vary according to any type of function including, for example, linear functions, polynomial functions, exponential functions, step functions, other types of functions, or combinations thereof.

In at least some implementations, the spatially varying polarizer 510 may be formed of a multi-twist retarder (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis.

Figure 6:
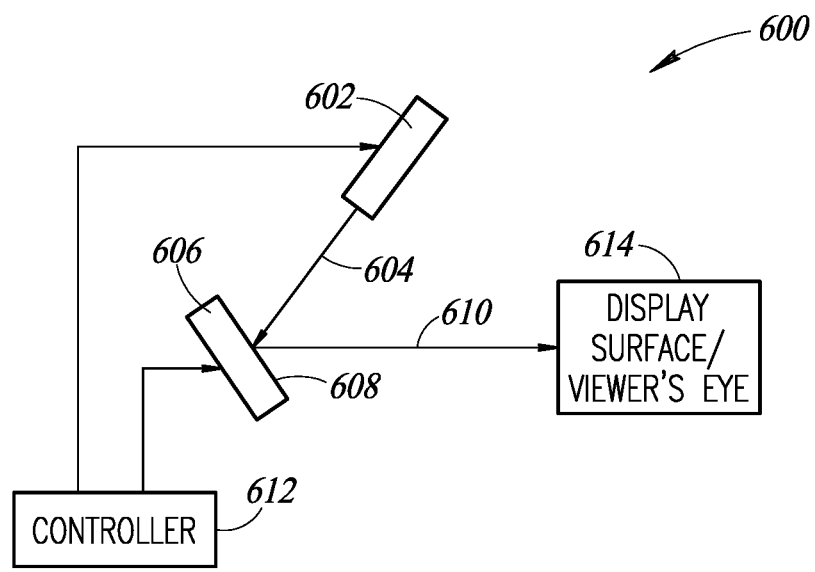
FIG. 6 is a schematic diagram of a scan beam display system, according to one non-limiting illustrated implementation.

FIG. 6 is a schematic diagram of a scan beam display system or projector 600, according to one non-limiting illustrated implementation. The scan beam display system 600 includes a light source 602, which may be a laser light source that emits a beam 604. The light source 602 may include two more light sources, such as a red light source, a green light source, and a blue light source. In such instances, the plurality of light sources may be combined into a single beam by a beam combiner. In at least some implementations, the light source 602 may include one or more color light sources (e.g., red, green, blue) and a light source that emits an invisible beam, such as an infrared beam or an ultraviolet beam, which may be used for various purposes such as eye tracking.

The beam 604 is incident on a scanning platform 606, which may include a microelectromechanical system (MEMS) based scanner, and reflects off of a scan mirror 608 of the platform to generate a controlled output beam 610. The scanning platform 606 may include a diffractive optical grating, a moving optic grating, a light valve, a rotating mirror, a movable silicon device, a digital light projector device, a flying spot projector, a liquid crystal on silicon (LCoS) device, or other scanning or modulating devices. The scanning platform 606 may be coupled to one or more drive circuits that are selectively controlled by a controller 612 coupled to the scanning platform and the light source 602, which may comprise any suitable control circuitry having one more components. The drive circuitry modulates the direction in which the scanning mirror 608 deflects the incident beam 604 to cause the output beam 610 to generate a scan, such as a raster scan, thereby creating a displayed image on an image plane such as a display surface or a viewer's eye 614.

Figure 7:
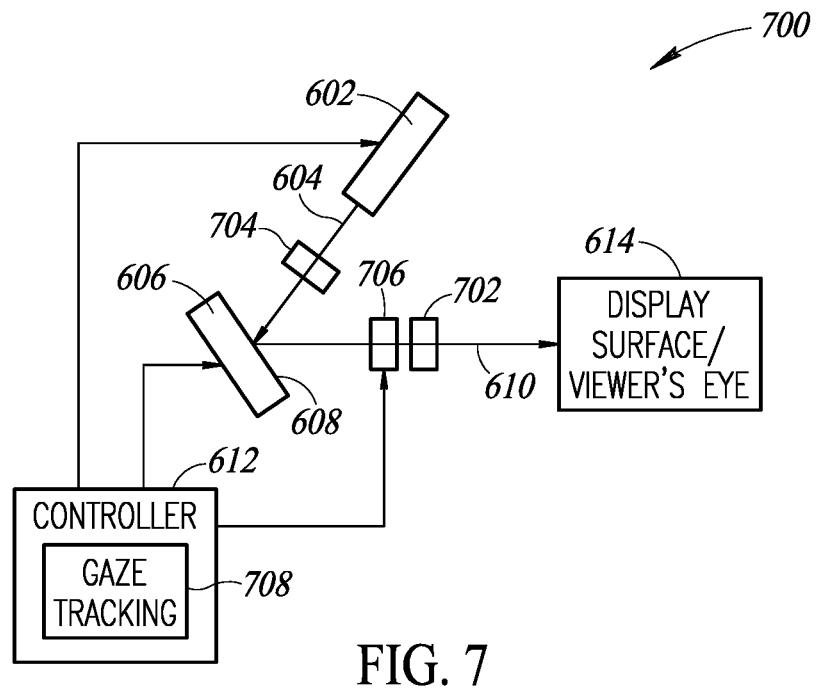
FIG. 7 is a schematic diagram of a scan beam display system that includes a spatially varying polarizer that is selectively adjusted based on a user's determined or inferred gaze location, according to one non-limiting illustrated implementation.

FIG. 7 is a schematic diagram of a scan beam display system or projector 700 according to one non-limiting illustrated implementation. The scan beam display system 700 may be similar or identical to the scan beam display system 600 of FIG. 6 in many respects. As such, like components are referenced with the same numerals and a discussion of such components is not repeated herein for the sake of brevity.

The scan beam display system 700 includes post-scan correction optics 702 ("post-scan optics") and collimation optics 704. The post-scan optics 702 may include one or more optics positioned in the light path after the scanning platform 606, which may generally be referred to herein as being "post-scan." The post-scan correction optics 702 may be designed and configured to correct or adjust one or more distortion artifacts in the projected image. Examples of such distortion may include smile distortion, pin cushion distortion, barrel distortion, off-axis projection-based distortion, etc. It should be appreciated that these are only non-limiting example types of distortion that the post-scan correction optics 702 may correct.

The post-scan optics 702 may include one or more of a waveguide-based optical system, a pancake optical system, a birdbath optical system, a coating-based optical system, etc. The post-scan optics may include one more components. The efficiency of the post-scan optics 702 may be very sensitive to the polarization of light that passes therethrough. That is, different polarizations will significantly change the intensity and stray light that makes it out of the post-scan optics 702. In at least some implementations, the display system 700 may also include collimating or beam forming optics 704 that may be utilized to at least partially regain loss of the infinite focus caused by the post-scan optics 702.

The display system 700 further includes a polarization compensation optic in the form of a spatially varying polarizer 706 positioned between the scan mirror 608 and the post-scan optics 702 to provide polarization compensation for the post-scan optics 702 which, as discussed above may be very polarization sensitive. The spatially varying polarizer 706 may be positioned on, adjacent to, or inside the post-scan optics 702, for example. In other implementations, the spatially varying polarizer 706 is positioned elsewhere in the optical path between the light source 602 and the displayed image (e.g., pre-scan, post-scan, adjacent the light source, etc.).

In at least some implementations, the controller 612 may be operatively coupled to the spatially varying polarizer 706 to selectively vary the spatially-dependent phase retardation of the spatially varying polarizer to any desired configuration. In such implementations, one or more thin-film transistor layers may be provided that allow the spatially-dependent phase retardation of the spatially varying polarizer 706 to be selectively controlled by the controller 612. As another example, the spatially varying polarizer 706 may comprises a plurality of independently controllable layers, wherein each layer can be controlled by the controller 612 to be in an active state or an inactive state. The controller 612 may control the phase retardation at any desired rate, such as one time only, periodically, at a rate that is equal to a frame rate of the display system 700 or a fraction thereof, etc.

In at least some implementations, the controller 612 may be operative to receive gaze tracking information 708, which may be used to selectively adjust the spatially-dependent phase retardation of the spatially varying polarizer 706 to be optimized in an optimized region where the user is believed to be currently gazing. Such gaze tracking information may be received from an eye tracking subsystem, from information about the content being displayed (e.g., objects of focus), or from any other source that provides information relating to where on a display the user is likely to be gazing.

As noted above, the efficiency of the post-scan optics 702 may be very sensitive to the polarization of light that passes therethrough. That is, different polarizations will significantly change the intensity and stray light that makes it out of the post-scan optics 702. It may be advantageous to optimize the spatially varying polarizer 706 over a relatively small region or field of view (e.g., 0-10 degrees, 0-30 degrees, other region), which may provide significantly better performance than optimizing over the entire field of view. Using gaze tracking information, the system may optimize a region for various characteristics (e.g., intensity, stray light) while configuring areas outside of the region to have lower performance (e.g., less intensity, more stray light). Since the user's vision is not as discerning in peripheral regions, the user may not even perceive that the performance of the display is reduced outside of the region in which the user is gazing.

Figure 8:
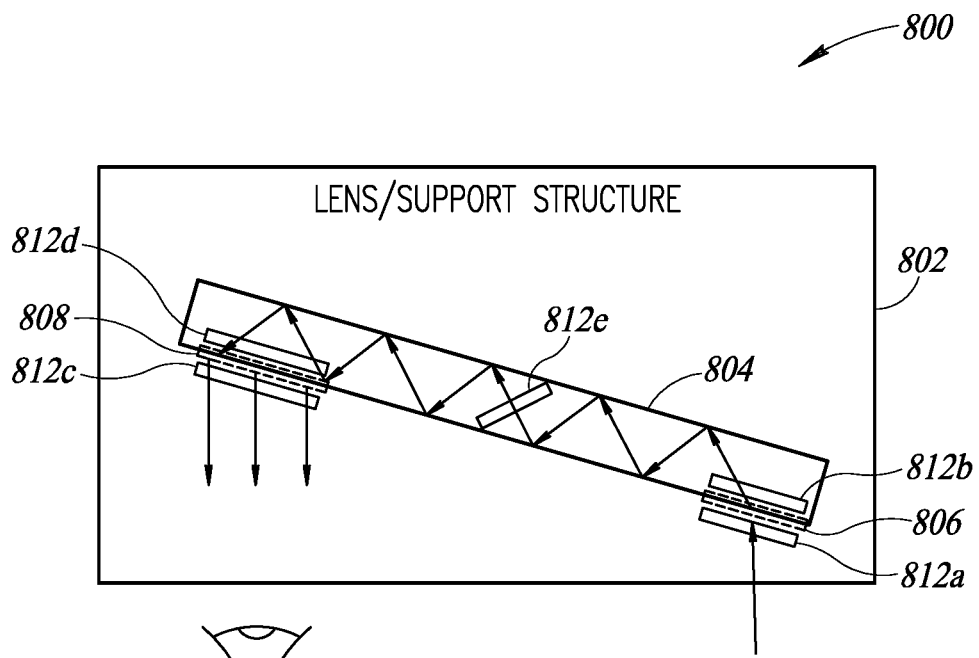
FIG. 8 is a schematic diagram of a display system that includes a waveguide-based optical system and a spatially varying polarizer, according to one non-limiting illustrated implementation.

FIG. 8 is a schematic diagram of a display system 800 that includes a waveguide-based optical system and a polarization compensation optic in the form of a spatially varying polarizer for use in a head-mounted display system, according to one non-limiting illustrated implementation. The display system 800 may include a lens or support structure 802 (e.g., prescription or non-prescription eye glasses lens). A planar waveguide structure 804 may be at least partially embedded in the structure 802 or positioned proximate to the structure (e.g., in front of or behind the structure). The waveguide 804 may be a rectangular (or other shape) prism structure formed of a material having an index of refraction that is sufficiently different from that of a surrounding structure (e.g., structure 802) to provide total internal reflection within the waveguide.

To enable light to couple into the waveguide 804, the display system 800 includes an in-coupler 806 physically coupled to a first portion of the waveguide. Similarly, to enable light to couple out of the waveguide 804 toward an eye 810 of the viewer, the display system 800 includes an out-coupler 808 physically coupled to a second portion of the waveguide. The display light that in-couples through the in-coupler 806 and out-couples through the out-coupler 808 may originate from a display light source, such as a projector, a scanning laser projector, a micro display, or other display light source, as discussed above. As non-limiting examples, the couplers 806 and 808 may include one or more of diffraction gratings, holograms, holographic optical elements, volume diffraction gratings, surface relief diffraction gratings, etc. The couplers 806 and 808 may also be reflection-type couplers or transmission-type couplers. As an example, the structure 802 may include a right eye glasses lens, and the in-coupler 806 may be positioned near the edge of the eyeglasses lens proximate a display source (e.g., projector), and the out-coupler may be positioned toward the center of the eyeglasses lens so that the viewer can see the light from the waveguide 804 while looking straight area or approximately straight ahead.

The display system 800 further includes a polarization compensation optic in the form of a spatially varying polarizer 812, various examples of which are shown in FIG. 8 as spatially varying polarizers 812a-812e. In the non-limiting illustrated example, illustrative examples 812a-812e of the spatially varying polarizer 812 are shown as being positioned at several non-limiting example locations of the display system 800. In application, only one spatially varying polarizer 812 may be present, but in other applications more than one spatially varying polarizer 812 may be present. As discussed elsewhere herein, in at least some implementations the spatially varying polarizer 812 may comprise a plurality of independently controllable layers. In particular, 812a shows the spatially varying polarizer positioned adjacent the in-coupler 806 on a side toward the display source to provide polarization compensation for light that enters the waveguide 804 which, as discussed above, may be very polarization sensitive. The spatially varying polarizer 812b is shown in FIG. 8 as being positioned adjacent the in-coupler 806 on an opposite side thereof compared to the example spatially varying polarizer 812a. Similarly, the spatially varying polarizer 812c is shown positioned adjacent the out-coupler 808 on a side that faces the user's eye 810, and the spatially varying polarizer 812d is shown positioned adjacent the out-coupler 808 on an opposite side thereof. The spatially varying polarizer 812e is shown positioned inside the waveguide 804 at a position that is between the in-coupler 806 and the out-coupler 808. It should be appreciated that the spatially varying polarizer 812 may be positioned on, adjacent or proximate to, or inside the waveguide 804, for example. In other implementations, the spatially varying polarizer 812 is positioned elsewhere in the optical path between the display light source and the eye of the viewer to provide polarization compensation.

FIG. 9A is a schematic diagram of a display 900 illustrating an optimized region 902 in a center of the display at a first time (t1) wherein the spatially varying polarizer is optimized for that region based on the user's gaze location. As discussed above, the spatially varying polarizer may be optimized to provide one or more enhanced characteristics (e.g., intensity, less stray light) in the optimized region 902 relative to the region 904 outside of the optimized region. FIG. 9B is a schematic diagram of the display 900 illustrating the optimized region 902 in a periphery of the display at a second time (t2) wherein the spatially varying polarizer is optimized for that region based on the user's gaze location. In general, the optimized region 902 may move to follow or track the user's known or inferred gaze location.

The optimized region 902 may be any size or shape, and its size or shape may be fixed or variable. For example, if a user is believed to be gazing at a large area of a display, or if there is some uncertainty as to where the user is gazing, the optimized region 902 may be relatively large. In contrast, if a user is believed to be gazing at a small area of a display, or if there is minimal uncertainty as to where the user is gazing, the optimized region 902 may be relatively small. In at least some implementations, the characteristics of the spatially varying polarizer near the edge between the optimized region 902 and the non-optimized region 904 may be blended (e.g., using a linear or non-linear blending function) to provide a smooth transition between the regions 902 and 904. The shape of the optimized region may be circular, rectangular, elliptical, or any other shape. As discussed elsewhere herein, spatially varying polarizer may have any suitable number of controllable layers that provide the desired shapes and sizes of regions that can be optimized.

FIG. 10 shows an example spatially varying polarizer or compensation optic 1010 coupled to a controller 1002, such as the controller 612 described above. The spatially varying polarizer 1010 may be similar or identical to any of the spatially varying polarizers discussed herein. The controller 1002 has a plurality of outputs 1014a, 1014b, 1014c respectively coupled to the plurality of inputs 1012a, 1012b, 1012c of a respective plurality of spatially varying polarizer layers 1011a, 1011b, 1011c of the spatially varying polarizer 1010. In the illustrated example, three layers of spatially varying polarizers are shown for explanatory purposes, but in application fewer layers (e.g., 1 layer, 2 layers) or more layers (e.g., 5 layers, 10 layers, 20 layers, etc.) may be used as desired. The controller 1002 sends over each output 1014 a control signal operative to cause the spatially varying polarizers 1011 to become active or inactive.

When inactive, each of the spatially varying polarizers 1011 may be optically clear or may only perform inherent optical modification associated with the material composition of the spatially varying polarizer 1011. Materials of various types have optical properties and are operative to change light. As described herein, each of the spatially varying polarizer layers 1011 may be formed of two or more twisted liquid crystal layers, for example. The liquid crystal layers of the spatially varying polarizer layers 1011 when turned off may still perform inherent optical modification. When turned on, the spatially varying polarizer 1011 performs the optical modification it has been designed to perform.

The first, second and third spatially varying polarizers 1011a, 1011b, 1011c are formed to perform first, second and third optical corrections or optimizations. In operation, the controller 1002 sends controls signals to the spatially varying polarizers 1011a, 1011b, 1011c to operate the spatially varying polarizers 1011a, 1011b, 1011c between active and inactive states. For example, to activate the first optical optimization and deactivate the second and third optical optimizations, the controller 1002 sends a control signal to the first spatially varying polarizer 1011a that activates the first spatially varying polarizer 1011a and sends respective control signals to the second and third spatially varying polarizers 1011b, 1011c that respectively deactivate the second and third spatially varying polarizers 1011b, 1011c. The first optical optimization may be a combination of sought optical correction and optical compensation. The optical compensation may compensate for inherent optical correction performed by the deactivated second and third spatially varying polarizers 1011b, 1011c. Light leaving the first spatially varying polarizer 1011a and traversing the deactivated second and third spatially varying polarizers 1011b, 1011c is thus pre-compensated for the inherent optical correction performed by the deactivated second and third spatially varying polarizers 1011b, 1011c.

As a non-limiting example, the first spatially varying polarizer 1011*a* may be designed to provide a first optimized region as shown in FIG. 9A, and the second spatially varying polarizer 1011*b* may be designed to provide a second optimized region as shown in FIG. 9B. Similarly, the third spatially varying polarizer 1011*c* may be designed to provide a third optimized region (not shown). The controller may then utilize gaze information to selectively control the states of the spatially varying polarizers 1011 such that the region at which the user is currently gazing is optimized by the spatially varying polarizers. For example, the controller may activate the first spatially varying polarizer 1011*a* at a first time t1, then activate the second spatially varying polarizer 1011*b* at a second time t2, etc. As noted above, the number of layers that may be independently controlled may be any suitable number of layers (e.g., 5-15 layers may be provided to provide 5-15 distinct regions, respectively, that can be optimized, etc.).

In another example, the controller 1002 may send a control signal to the first spatially varying polarizer 1011*a* that deactivates the first spatially varying polarizer 1011*a* and may send respective control signals to the second and third spatially varying polarizers 1011*b*, 1011*c* to activate the second and third spatially varying polarizers 1011*b*, 1011*c*. The first optical compensation provided by the second and third spatially varying polarizers 1011*b*, 1011*c* is a combination of the second and third optical corrections. The controller 1002 may selectively switch the spatially varying polarizers 1011 between active and inactive states to cause the spatially varying polarizer 1010 provide optical correction.

Figure 11:
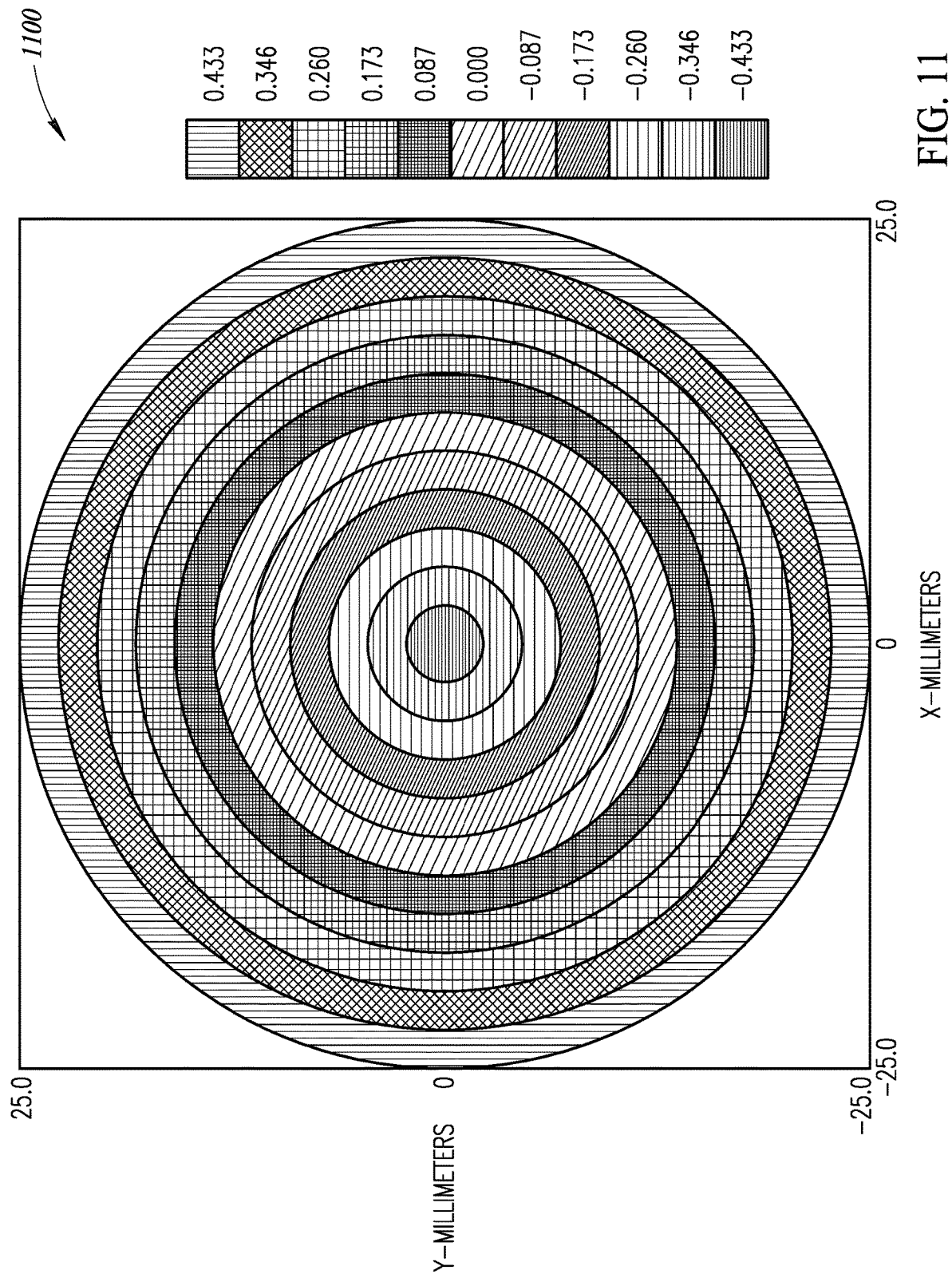
FIG. 11 is an example surface phase map for a spatially varying polarizer, according to one non-limiting illustrated implementation.
Figure 12:
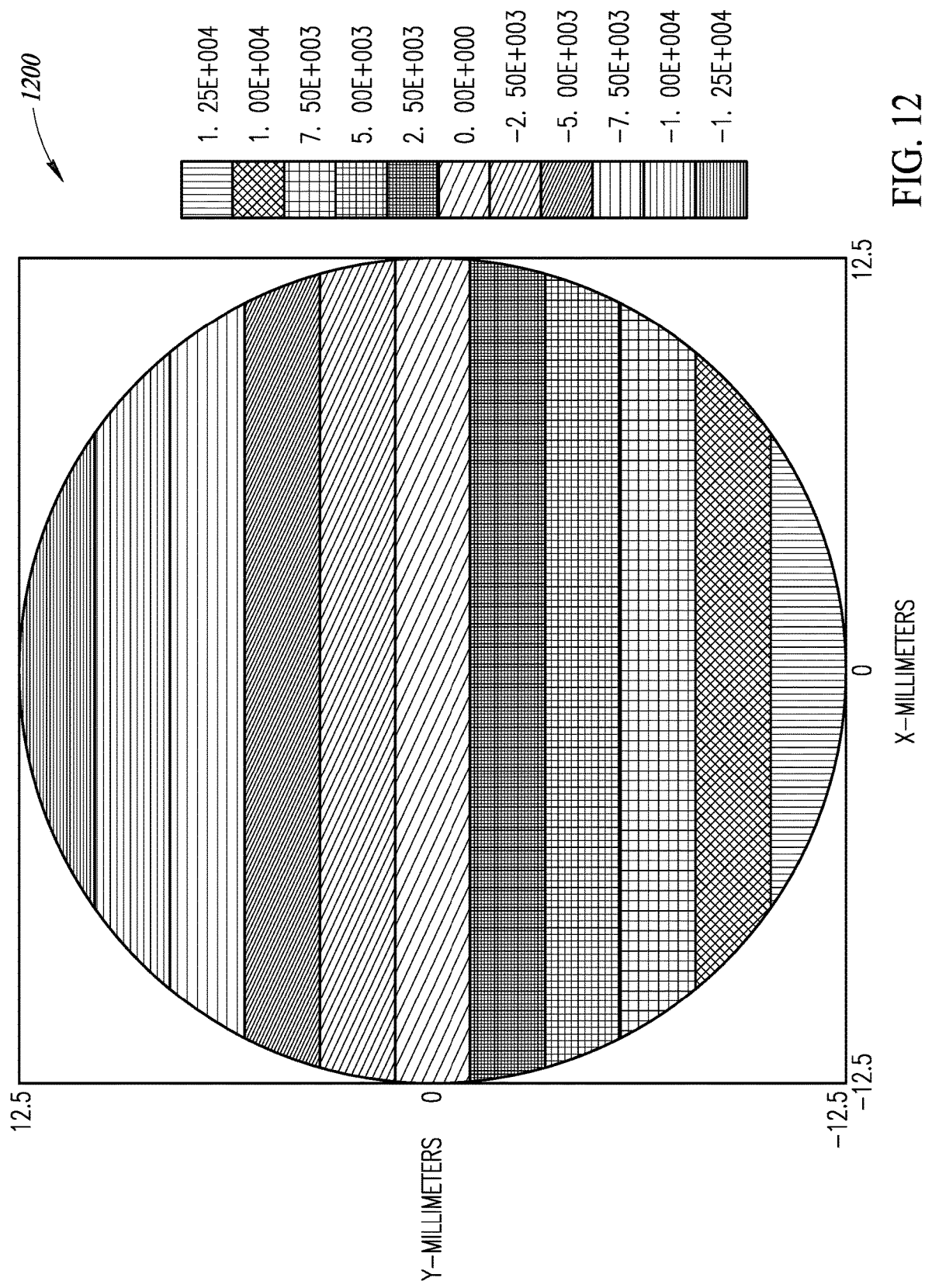
FIG. 12 is another example surface phase map for spatially varying polarizer, according to one non-limiting illustrated implementation.

The spatially varying polarizers of the present disclosure may provide spatially varying polarization defined by a surface phase map, or by a combination of two or more surface phase maps multiplexed together. FIGS. 11 and 12 show two non-limiting examples of surface phase maps for the spatially varying polarizers. In the example surface map 1100 of FIG. 11, the phase is varied concentrically from the center of the optic toward the outer periphery between −0.433 wavelengths to +0.433 wavelengths. In the example surface map 1200 of FIG. 12, the phase is varied linearly from −1.25E+004 at the bottom (as shown) of the optic to +1.25E+004 at the top (as shown) of the optic, wherein the units are periods of a radians each. In application, two or more spatially varying polarizers may be stacked together. For instance, the concentric surface phase map 1100 may be multiplexed with the linear phase map 1200, etc. It is noted that although the phase variance of the surface maps 1100 and 1200 are shown as discrete steps for simplicity, in practice the phase may be continuously variable across the surface of the optic. Further, the particular phase values in the surface phase maps 1100 and 1200 are provided as examples, and should not be considered limiting.

In at least some implementations, the surface phase map of a spatially varying polarizer may be designed to offset or compensate for undesirable polarization caused by at least one other component of the display system, such as a display source, lens, etc. In such implementations, a phase profile or map of the optical system (e.g., the lens, or the lens and the display source) may first be determined. The determined phase map may then be inverted and applied to the spatially varying polarizer, such that the spatially varying polarizer offsets or compensates for the undesirable effects caused by other components of the optical system.

By utilizing the spatially varying polarizers discussed herein, optical designers have significantly more degrees of freedom to produce optical systems that have improved performance and efficiency, which allows for display systems that provide a better viewing experience, cost less, are smaller in size or weight, consume less power, and provide other advantages that will be apparent to those skilled in the art.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A display system, comprising:
 a display light source;
 a pupil relay system positioned to relay a first pupil along an optical path from the display light source to a second pupil at an eye of a viewer, the pupil relay system comprising:
  a polarization sensitive optic positioned in the optical path; and
  a spatially varying polarizer positioned in the optical path between the display light source and the polarization sensitive optic, the spatially varying polarizer having a polarization that spatially varies as a function of position to provide polarization compensation for the polarization sensitive optic; and
 control circuitry operatively coupled to the spatially varying polarizer, the control circuitry configured to:
  receive gaze information from an eye tracking subsystem indicative of a user's current or predicted gaze location; and
  selectively adjust the variable polarization of the spatially varying polarizer based at least in part on the received gaze information to provide polarization compensation for the polarization sensitive optic.

2. The display system of claim 1 wherein the spatially varying polarizer comprises a plurality of layers, each of the plurality of layers being independently controllable by the control circuitry to be in an active state or an inactive state, wherein, in operation, the control circuitry controls the state of the plurality of layers to selectively adjust the variable polarization of the spatially varying polarizer.

3. The display system of claim 2 wherein each of the layers has a spatially varying polarization that is different from at least one of the other of the plurality of layers.

4. The display system of claim 1 wherein the control circuitry optimizes the spatially varying polarizer for a first region associated with the user's gaze location relative to a second region outside of the first region.

5. The display system of claim 1 wherein the control circuitry controls the spatially varying polarizer to provide relatively higher brightness at a first region associated with the user's gaze location relative to a second region outside of the first region.

6. The display system of claim 1 wherein the control circuitry controls the spatially varying polarizer to provide a relatively lower amount of stray light at a first region associated with the user's gaze location relative to a second region outside of the first region.

7. The display system of claim 1 wherein the control circuitry selectively adjusts the variable polarization of the spatially varying polarizer in real-time as the received gaze information is updated by the eye tracking subsystem.

8. The display system of claim 1, further comprising:
an eye tracking subsystem that generates the gaze information.

9. The display system of claim 1 wherein the spatially varying polarizer comprises a multi-twist retarder.

10. The display system of claim 1 wherein the retardation of the spatially varying polarizer varies as a function of a horizontal dimension or a vertical dimension.

11. The display system of claim 1 wherein the retardation of the spatially varying polarizer varies across a field of view of the display system.

12. The display system of claim 1 wherein the polarization sensitive optic comprises a waveguide-based optical system, a pancake optical system, a birdbath optical system, or a coating-based optical system.

13. The display system of claim 1 wherein the display light source comprises a laser light source, and the display system further comprises a scan mirror positioned to receive a light beam from the laser light source and to relay the received light toward the pupil relay system.

14. The display system of claim 13, further comprising a beam-forming optic positioned between the laser light source and the scan mirror.

15. The display system of claim 1 wherein at least a portion of the spatially varying polarizer is positioned on, adjacent to, or in the polarization sensitive optic.

16. The display system of claim 1 wherein the polarization sensitive optic comprises a waveguide, and the spatially varying polarizer is positioned on the waveguide, inside the waveguide, or proximate a port of the waveguide.

17. The display system of claim 1 wherein the display system is a display system of a head-mounted display system.

18. A head-mounted display system, comprising:
a support structure;
a display system coupled to the support structure, the display system comprising:
a display light source; and
a pupil relay system positioned to relay a first pupil along an optical path from the display light source to a second pupil at an eye of a viewer, the pupil relay system comprising:
a polarization sensitive optic positioned in the optical path; and
a spatially varying polarizer positioned in the optical path between the display light source and the polarization sensitive optic, the spatially varying polarizer having a polarization that spatially varies as a function of position to provide polarization compensation for the polarization sensitive optic; and
control circuitry operatively coupled to the spatially varying polarizer, the control circuitry configured to:
receive gaze information from an eye tracking subsystem indicative of a user's current or predicted gaze location; and
selectively adjust the variable polarization of the spatially varying polarizer based at least in part on the received gaze information to provide polarization compensation for the polarization sensitive optic.

19. The head-mounted display system of claim 18 wherein the spatially varying polarizer comprises a plurality of layers, each of the plurality of layers being independently controllable by the control circuitry to be in an active state or an inactive state, wherein, in operation, the control circuitry controls the state of the plurality of layers to selectively adjust the variable polarization of the spatially varying polarizer.

20. The head-mounted display system of claim 19 wherein each of the layers has a spatially varying polarization that is different from at least one of the other of the plurality of layers.

21. The head-mounted display system of claim 18 wherein the control circuitry optimizes the spatially varying polarizer for a first region associated with the user's gaze location relative to a second region outside of the first region.

22. The head-mounted display system of claim 18 wherein the control circuitry controls the spatially varying polarizer to provide relatively higher brightness at a first region associated with the user's gaze location relative to a second region outside of the first region.

23. The head-mounted display system of claim 18 wherein the control circuitry controls the spatially varying polarizer to provide a relatively lower amount of stray light at a first region associated with the user's gaze location relative to a second region outside of the first region.

24. The head-mounted display system of claim 18 wherein the control circuitry selectively adjusts the variable polarization of the spatially varying polarizer in real-time as the received gaze information is updated by the eye tracking subsystem.

25. The head-mounted display system of claim 18 wherein the spatially varying polarizer comprises a multi-twist retarder.

26. The head-mounted display system of claim 18 wherein the polarization sensitive optic comprises a waveguide-based optical system, a pancake optical system, a birdbath optical system, or a coating-based optical system.

27. The head-mounted display system of claim 18 wherein the display light source comprises a laser light source, and the display system further comprises a scan mirror positioned to receive a light beam from the laser light source and to relay the received light toward the pupil relay system.

28. The head-mounted display system of claim 27, further comprising a beam-forming optic positioned between the laser light source and the scan mirror.

29. The head-mounted display system of claim 18 wherein the polarization sensitive optic comprises a waveguide, and the spatially varying polarizer is positioned on the waveguide, inside the waveguide, or proximate a port of the waveguide.

30. A head-mounted display system, comprising:
a support structure;
a display system coupled to the support structure, the display system comprising:
a laser light source;
a scan mirror positioned to receive a light beam from the laser light source; and
a pupil relay system positioned to relay a first pupil received from the scan mirror along an optical path to a second pupil at an eye of a viewer, the pupil relay system comprising:
a polarization sensitive optic positioned in the optical path; and
a spatially varying polarizer positioned in the optical path between the laser light source and the polarization sensitive optic, the spatially varying polarizer having a polarization that spatially varies as a function of position to provide polarization compensation for the polarization sensitive optic;

an eye tracking subsystem operative to generate gaze information indicative of a user's current or predicted gaze location; and control circuitry operatively coupled to the spatially varying polarizer, the control circuitry configured to:

receive gaze information from the eye tracking subsystem as the user views a display of the display system; and selectively adjust the variable polarization of the spatially varying polarizer based at least in part on the received gaze information to provide polarization compensation for the polarization sensitive optic.

31. The head-mounted display system of claim 30 wherein the spatially varying polarizer comprises a plurality of layers, each of the plurality of layers being independently controllable by the control circuitry to be in an active state or an inactive state, wherein, in operation, the control circuitry controls the state of the plurality of layers to selectively adjust the variable polarization of the spatially varying polarizer.

32. The head-mounted display system of claim 31 wherein each of the layers has a spatially varying polarization that is different from at least one of the other of the plurality of layers.

33. The head-mounted display system of claim 30 wherein the spatially varying polarizer comprises a multi-twist retarder.

34. The head-mounted display system of claim 30 wherein the polarization sensitive optic comprises a waveguide-based optical system, a pancake optical system, a birdbath optical system, or a coating-based optical system.

* * * * *